US008251203B2

(12) United States Patent
Bacic et al.

(10) Patent No.: US 8,251,203 B2
(45) Date of Patent: Aug. 28, 2012

(54) METHOD OF OPERATING AN INSTALLATION FOR CONVEYING AND SORTING BAGGAGE ITEMS

(75) Inventors: Mato Bacic, Nürnberg-Krottenbach (DE); Alexander Fiedler, Nürnberg (DE); Günter Plank, Postbauer-Heng (DE); Christian Schuderer, Neunkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 12/787,663

(22) Filed: May 26, 2010

(65) Prior Publication Data

US 2010/0300832 A1 Dec. 2, 2010

(30) Foreign Application Priority Data

May 26, 2009 (DE) .......................... 10 2009 022 666

(51) Int. Cl.
*B65G 43/10* (2006.01)

(52) U.S. Cl. ..................... 198/617; 198/341.03; 700/230

(58) Field of Classification Search .................. 198/340, 198/341.03, 341.07, 617; 700/214, 226, 700/228, 230

See application file for complete search history.

(56) References Cited

U.S. PATENT DOCUMENTS

| 3,648,838 | A | * | 3/1972 | Hiromura | 209/3.3 |
| 5,056,647 | A | * | 10/1991 | Rosenbaum | 198/460.1 |
| 5,793,639 | A | * | 8/1998 | Yamazaki | 700/226 |
| 5,842,555 | A | * | 12/1998 | Gannon et al. | 198/358 |
| 6,158,658 | A | * | 12/2000 | Barclay | 235/384 |
| 6,594,547 | B2 | * | 7/2003 | Manabe et al. | 700/227 |
| 6,647,316 | B2 | * | 11/2003 | Bahri et al. | 700/217 |
| 6,789,660 | B1 | * | 9/2004 | Bruun et al. | 198/347.1 |
| 7,231,355 | B2 | * | 6/2007 | Schoen et al. | 705/333 |
| 7,667,604 | B2 | * | 2/2010 | Ebert et al. | 340/572.4 |
| 7,753,191 | B2 | * | 7/2010 | Lykkegaard et al. | 198/401 |

FOREIGN PATENT DOCUMENTS

WO 2007014834 A1 2/2007

* cited by examiner

*Primary Examiner* — Douglas Hess
(74) *Attorney, Agent, or Firm* — Laurence A. Greenberg; Werner H. Stemer; Ralph E. Locher

(57) ABSTRACT

A method of operating an installation for conveying and sorting baggage items within an airport building, preferably between the check-in area and reclaim area for the baggage items and the loading units assigned to a certain flight. The installation has a complex electrically and/or electronically driven and controlled conveying and handling system for transporting, sorting, transferring, storing and checking the baggage items, which are transported in a state in which they rest loosely on conveyors or are located in containers. In order to configure a method of operating the installation such that, along with relatively low energy costs and relatively low levels of wear, it is possible to reduce the operating costs of the installation and the maintenance costs, it is proposed that it is possible for the power supply to individual suitable installation parts or components to be switched on and off in dependence on the state of occupancy of the installation and/or on the varying loading.

7 Claims, No Drawings

METHOD OF OPERATING AN INSTALLATION FOR CONVEYING AND SORTING BAGGAGE ITEMS

CROSS-REFERENCE TO RELATED APPLICATION

This application claims the priority, under 35 U.S.C. §119, of German patent application DE 10 2009 022 666.4, filed May 26, 2009; the prior application is herewith incorporated by reference in its entirety.

BACKGROUND OF THE INVENTION

Field of the Invention

The invention relates to a method of operating an installation for conveying and sorting baggage items within airport buildings, preferably between the check-in area and the baggage claim area for the baggage items and the loading units assigned to a certain flight. The installation comprises a complex electrically and/or electronically driven and controlled conveying and handling means for transporting, sorting, transferring, storing and checking the baggage items, which are transported in a state in which they rest loosely on conveyors or are disposed in containers.

Passengers for flights usually check in relatively large and heavy baggage items at the check-in counter. A short conveying belt conveys the baggage into the installation where it ultimately passes, by way of the conveying and handling means, to a location where airport workers specializing in quick loading load the baggage, in the first instance, into loading units, such as standard containers or transporting carriages, and, finally, onto the aircraft. Conversely, when a flight arrives, the baggage is unloaded from the aircraft and transferred onto carriages which are linked to form trains and are moved to a collecting location, which the passengers cannot see. The collecting location is usually situated alongside, or in, the terminal building. There, the baggage is positioned on a conveying belt which then transports the baggage, via a complex conveying means, to the so-called baggage-delivery belt, where it can be reclaimed by the passengers. It is also known for sub-regions of the installation to be automated, this replacing heavy manual work. The baggage-handling means is very complex, and the installations often comprise many kilometers of conveying means with high-outlay mechanisms and control means for the conveyors, diverters, transfer apparatuses, and the like.

In respect of the conveying means, a distinction can be drawn between roughly two basic principles, namely the straightforward "loose" transportation of baggage items on the surface of conveyors and the container-type conveying means, in the case of which baggage items are transported in a state in which they are located in containers. In this case, a respective baggage item is combined with a container, which heads for the destination with the baggage item in it. Baggage-item identification, which is necessary for correct addressing in the installation, takes place via bar codes on the container, or via electronic information carriers, which are read as the containers move past. When the baggage is transported directly on conveyors, the baggage item is provided with a baggage tag which has the destination information printed on it or in which are integrated RFID tags, which can be read in reading stations. The information is processed in a central computer and used in order to activate the handling means.

The container-type conveying means uses passive conveying units which are driven via belts and/or rollers. They therefore require relatively complex route guidance with a large number of mechanical wearing parts, even though the containers are usually straightforward plastics-material tubs. The containers are sorted decentrally, as it were en route, by being introduced into the installation and removed from the installation. For this purpose, it is necessary to have sufficient power supplies for the drives of the conveyors and handling apparatuses, and these give rise to comparatively high costs and maintenance outlay, especially since the empty containers have to be returned somehow to check-in. Therefore, container systems are worthwhile predominantly only in large airports, where a very large number of baggage items are to be handled. However, the operation of active conveying means also requires large amounts of power, which has to be supplied even when only a small number of baggage items have to be transported.

A great disadvantage of a complex baggage-transporting installation follows from the vastly differing numbers of flights in large airports throughout the course of a day. There are times during which flights arrive and depart in very great numbers, and the installation reaches the limits of its capacity. Then there are times during which, despite only small numbers of baggage items, the large installations have to be operated with high power consumption and the power has to be made available. In times during which states of occupancy are low, such installations operate uneconomically and are not energy-efficient.

SUMMARY OF THE INVENTION

It is accordingly an object of the invention to provide a method of operating a baggage handling installation which overcomes the above-mentioned disadvantages of the heretofore-known devices and methods of this general type and which provides for relatively low energy costs and relatively low levels of wear, and the attendant reduction in the operating costs of the installation and the maintenance costs.

With the foregoing and other objects in view there is provided, in accordance with the invention, a method of operating an installation for conveying and sorting baggage items within airport buildings (in particularly, for baggage transport between a check-in area and a reclaim area for the baggage items and loading units assigned to a certain flight), where the system includes a complex electrically and/or electronically driven and controlled conveying and handling system and the baggage items are transported resting loosely on conveyors or disposed in containers. The method which comprises:

selectively switching on and off a power supply to individual suitable installation parts or components in dependence on a state of occupancy of the installation and/or on the varying loading.

In other words, the objects of the invention are achieved in that the power supply to individual suitable installation parts or components can be switched on and off in dependence on the state of occupancy of the installation and/or on the varying loading. The invention thus takes account of the vastly differing states of occupancy of the installation in that inefficiently operating sub-regions of the installation with only small numbers of baggage items are switched off altogether and therefore no longer use any power.

Advantageously according to the invention, installation regions are emptied once upstream installation parts have been switched off, or baggage items have been redirected, and they are then temporarily brought to a complete standstill. That region of the installation which is not highly frequented is emptied by, for example, the baggage being redirected, upstream of this region, into some other region, or no new baggage is introduced into this region. The empty region of the installation is then switched off.

Since large installations always have redundant routes available for the baggage, it is possible, preferably during times where there are only small numbers of baggage items, for some of these regions to be brought to a standstill and maintained during this time without the rest of the baggage-transporting means being obstructed in any way.

According to the invention, the state of occupancy of the installation can be influenced on the basis of manual allocation. Certain regions which are not highly frequented are deliberately no longer provided with baggage and can thus be switched off. It is possible to devise a kind of timetable for the installation, which leaves out certain routes at certain times.

However, it is also possible, according to the invention, to predict the state of occupancy of the installation and to use the prediction in order to change the loading. It is possible in particular, according to another feature of the invention, for the state of occupancy of the installation to be determined on the basis of historical experimental values and to be derived therefrom. The operators of the installation know that certain weekdays or vacation days, or vacation periods, give rise to certain peaks in which there are particularly high numbers, or low numbers, of baggage items. These experimental values can be entered in order to achieve the target according to the invention.

The advantages of the invention are obvious. It is possible for the amount of power used to be reduced considerably, this having the effect of both reducing costs and benefiting the environment. The practice of installation parts being specifically switched off and on means that the wear to these installation parts is also restricted, which in turn reduces the maintenance outlay and optimizes costs. Installation parts brought to a standstill in accordance with the criteria of the invention can be maintained while they are at a standstill, without the installation being disrupted in any way.

Other features which are considered as characteristic for the invention are set forth in the appended claims.

Although the invention is illustrated and described herein as embodied in a method of operating an installation for conveying and sorting baggage, it is nevertheless not intended to be limited to the details shown, since various modifications and structural changes may be made therein without departing from the spirit of the invention and within the scope and range of equivalents of the claims.

The invention claimed is:

1. Method of operating an installation for conveying and sorting baggage items within airport buildings, the installation having a first installation region and at least a second installation region, the method which comprising:
    transporting baggage items from a start point to a final point along a first transport route through the first installation region;
    transporting baggage items from the start point to the final point along a second transport route through the second installation region;
    operating installation components for sorting, transferring, storing and checking the baggage items in the installation regions;
    determining a state of occupancy of the installation;
    choosing among the installation regions an installation region to be switched off in dependence of the state of occupancy of the installation; and
    selectively switching off a power supply to the installation components of the installation region to be switched off.

2. The method of operating an installation according to claim 1, wherein the start point is a check-in area and the final point is a location where the baggage items unloaded into loading units assigned to certain flights.

3. The method of operating an installation according to claim 2, which further comprises performing maintenance of the installation components of the installation region to be switched off while the baggage items are transported exclusively through the installation region which has not been switched off.

4. The method of operating an installation according to claim 1, which further comprises transporting the baggage items exclusively through the installation region which is not to be switched off;
    switching off the installation components successively downstream along the respective transport route in the installation region to be switched off until the installation region to be switched off is free of baggage items.

5. The method of operating an installation according to claim 1, wherein the step of determining the state of occupancy of the installation includes predicting a state of occupancy of the installation at a later time.

6. The method of operating an installation according to claim 1, wherein the step of determining the state of occupancy of the installation includes determining the state of occupancy on a basis of historical experimental values.

7. The method of operating an installation according to claim 1, wherein the start point is an unloading location where the items are unloaded from an aircraft and the final point is a baggage claim area.

* * * * *